United States Patent
Ishioka et al.

(10) Patent No.: US 11,175,123 B2
(45) Date of Patent: Nov. 16, 2021

(54) CONTROL METHOD OF SURFACE CHARACTERISTIC MEASURING APPARATUS

(71) Applicant: MITUTOYO CORPORATION, Kanagawa (JP)

(72) Inventors: Takayuki Ishioka, Hiroshima (JP); Minoru Katayama, Hiroshima (JP)

(73) Assignee: MITUTOYO CORPORATION, Kanagawa (JP)

( * ) Notice: Subject to any disclaimer, the term of this patent is extended or adjusted under 35 U.S.C. 154(b) by 230 days.

(21) Appl. No.: 16/439,035

(22) Filed: Jun. 12, 2019

(65) Prior Publication Data

US 2020/0003542 A1 Jan. 2, 2020

(30) Foreign Application Priority Data

Jun. 30, 2018 (JP) .............................. JP2018-125664

(51) Int. Cl.
*G01B 5/20* (2006.01)
(52) U.S. Cl.
CPC ...................... *G01B 5/20* (2013.01)
(58) Field of Classification Search
CPC ..................................................... G01B 5/20
USPC ....................................................... 702/168
See application file for complete search history.

(56) References Cited

U.S. PATENT DOCUMENTS

| | | | |
|---|---|---|---|
| 8,915,124 B2 | 12/2014 | Nakayama | |
| 9,091,521 B2 | 7/2015 | Nakayama et al. | |
| 9,316,476 B2* | 4/2016 | Shindo | G01B 5/201 |
| 10,161,747 B2 | 12/2018 | Sakai et al. | |
| 2010/0011601 A1* | 1/2010 | Funabashi | G01B 5/012 33/561 |
| 2012/0266475 A1 | 10/2012 | Nakayama et al. | |
| 2015/0143708 A1* | 5/2015 | Noda | G01B 5/20 33/503 |
| 2017/0270685 A1 | 9/2017 | Koga et al. | |
| 2019/0145878 A1* | 5/2019 | Coudert | G01N 3/46 73/81 |

* cited by examiner

*Primary Examiner* — Ricky Go
(74) *Attorney, Agent, or Firm* — Greenblum & Bernstein, P.L.C.

(57) ABSTRACT

A control method of surface characteristic measuring apparatus relatively displaces by a relative displacement mechanism, detects when the distal end of the stylus contacting the measurable surface, calculates an amount of relative displacement in the Z-axis direction between the measuring device and the measured object required for a measuring arm to be leveled after the distal end of the stylus contacts the measurable surface, calculates a displacement amount generated in the distal end of the stylus in an X-axis direction when the measuring device and the measured object are relatively displaced only by in the Z-axis direction; and levels the measuring arm by relatively displacing only by the measuring device and the measured object in the Z-axis direction by the relative displacement mechanism, and relatively displaces only by the measuring device and the measured object in the X-axis direction by the relative displacement mechanism at the same time.

5 Claims, 14 Drawing Sheets

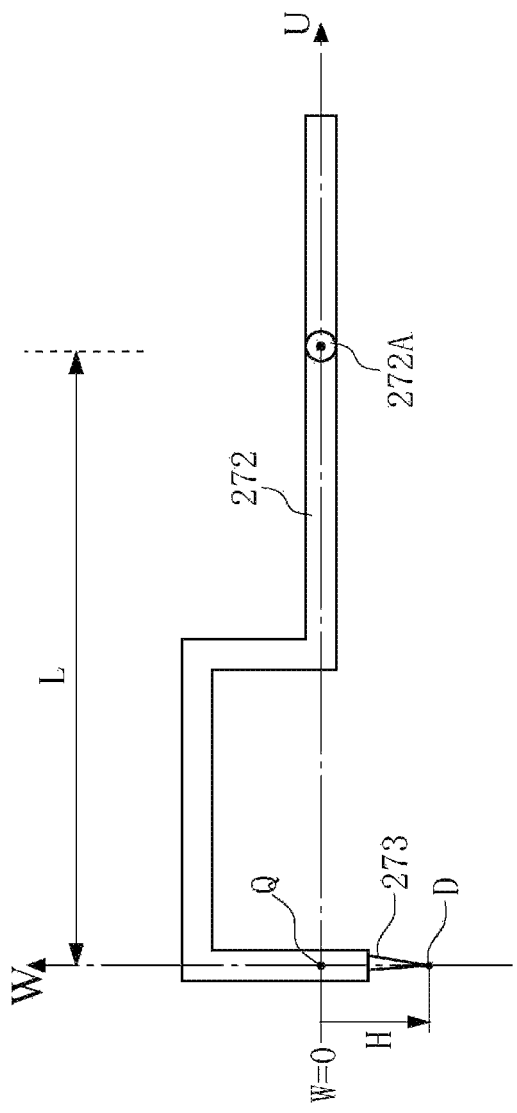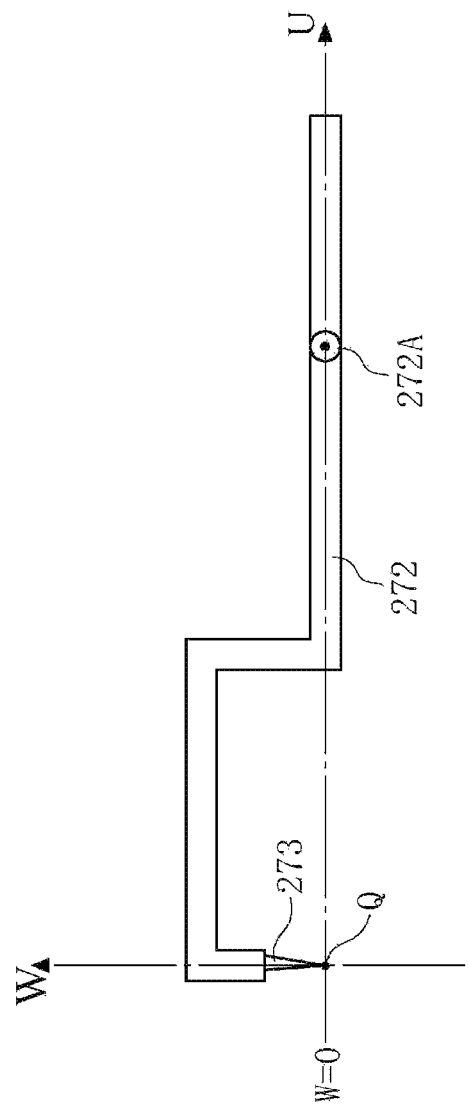
Fig. 4A
Fig. 4B

CONTROL METHOD OF SURFACE CHARACTERISTIC MEASURING APPARATUS

CROSS-REFERENCE TO RELATED APPLICATIONS

The present application claims priority under 35 U.S.C. § 119 of Japanese Application No. 2018-125664, filed on Jun. 30, 2018, the disclosure of which is expressly incorporated by reference herein in its entirety.

BACKGROUND OF THE INVENTION

1. Field of the Invention

The present invention relates to a control method of a surface characteristic measuring apparatus.

2. Description of Related Art

A surface characteristic measuring apparatus is known in which a surface of a measured object/measurable object is profiled and scanned by a stylus to measure a surface characteristic of the measured object (outline, roughness, undulation, and the like) (Japanese Patent Laid-open Publication No. 2012-225742).

FIG. 1 illustrates a surface characteristic measuring apparatus 100. The surface characteristic measuring apparatus 100 includes a surface characteristic measuring apparatus 200 and a control device 300.

The surface characteristic measuring apparatus 200 includes a base 210, a stage 220, a relative displacement mechanism 230, and a measuring device 270.

The stage 220 is arranged above the base 210 and a measured object W is placed on a top surface of the stage 220.

The relative displacement mechanism 230 relatively displaces the measuring device 270 and the stage 220. As the relative displacement mechanism 230, there are a Y-axis drive mechanism 240, a Z-axis drive mechanism 250, and an X-axis drive mechanism 260. The Y-axis drive mechanism 240 is provided between the base 210 and the stage 220, and displaces the stage 220 in one direction in a horizontal direction (Y-axis direction). In this example, the Y-axis direction is in a direction perpendicular to a plane of the drawing sheet in FIG. 1.

The Z-axis drive mechanism 250 includes a Z column 251 standing upright on a top surface of the base 210, and a Z slider 252 provided so as to be capable of moving up and down in a vertical direction (Z-axis direction) on the Z column 251. The details of the Y-axis drive mechanism 240 and the Z-axis drive mechanism 250 are omitted from the drawings, however, they may be configured with a feed screw mechanism that includes a ball screw shaft and a nut member threading onto the ball screw shaft, for example. A Y-direction position detector 241 (see FIG. 5) is provided to the Y-axis drive mechanism 240 to detect a relative movement of the base 210 and the stage 220. A Z-direction position detector 253 (see FIG. 5) is provided to the Z-axis drive mechanism 250 to detect a up-down amount of the Z slider 252.

The X-axis drive mechanism 260 is provided inside the Z slider 252 and displaces the measuring device 270 in an X-axis direction. In FIG. 1, the X-axis direction is a left-to-right direction to the plane of the drawing, that is, a direction orthogonal to the displacement direction of the stage 220 (Y-axis direction), and the displacement direction of the Z slider 252 (Z-axis direction).

FIG. 2 illustrates a configuration of the X-axis drive mechanism 260 and the measuring device 270. FIG. 2 illustrates an exemplary case where the measuring device 270 measures an outline. FIG. 2 shows inside of the Z slider 252 and inside of a casing 276 of the measuring device 270. The X-axis drive mechanism 260 includes a guide rail 261, an X slider 262, an X-direction position detector 263, and a feeding mechanism 264.

The guide rail 261 is provided fixated along the X direction and the X slider 262 is provided so as to be capable of sliding on the guild rail 261. The X-direction position detector 263 detects an X-axis direction position of the X slider 262. The feeding mechanism 264 includes a feed screw shaft 265, a motor 266, and a power transmission mechanism 267. The feed screw shaft 265 is screwed to the X slider 262. Rotation power of the motor 266 is transmitted to the feed screw shaft 265 via the power transmission mechanism 267. The X slider 262 is displaced along the X-axis direction from the rotation of the feed screw shaft 265.

Next, a configuration of the measuring device 270 is described. The measuring device 270 includes a stylus 273 that contacts with a measured surface/measurable surface S of the measured object W (FIG. 1) placed on the stage 220, and detects micro vertical movement of the stylus 273. The measuring device 270 includes a bracket 271, a measuring arm 272, the stylus 273, a balance weight 272B, a W-direction movement detector 274, a measuring force provider 275, and the casing 276.

The bracket 271 is suspendingly supported by the X slider 262 and the measuring arm 272 is supported by the bracket 271 so as to be able to oscillate in the vertical direction with a rotation axis 272A as a fulcrum (circular arc movement). The stylus 273 is provided projecting vertically toward a length direction of the measuring arm 272 on a foremost end of the measuring arm 272 (left end in FIG. 2). In this example, the stylus 273 is installed facing downward. The balance weight 272B is provided so as to be capable of position adjustment to a base end side of the measuring arm 272 (right end in FIG. 2).

The W-direction movement detector 274 detects a rotation angle θ from the circular arc movement of the measuring arm 272. The W-direction movement detector 274 includes a scale 274A provided with scale marks (not shown in drawings) that is curved along a direction of the circular arc movement of the measuring arm 272 and a detection head 274B provided opposite to the scale 274A. The scale 274A is fixated, at the base end side of the measuring arm 272, to the measuring arm 272 so as to move integrally with the measuring arm 272. In addition, the detection head 274B is provided fixated to the bracket 271 by a supporting member (not shown in the drawings). The circular arc movement of the measuring arm 272 is detected by the detection head 274B and the detection head 274B outputs a number of pulse signals (displacement detection pulse signal) corresponding to the circular arc movement of the measuring arm 272.

A coordinate axis indicating movement of the measuring arm 272 and the stylus 273 is shown in FIGS. 2 and 3. The measuring arm 272 in a horizontal position is a standard position (initial position). An axis parallel to the X axis and passing through the rotation axis 272A is defined as a U axis. An axis parallel to the Z axis and passing through a forefront (distal) end D of the stylus 273 when the measuring arm 272 is horizontal is defined as a W axis. Also, a connection portion of the stylus 273 and the measuring arm 272 is a base end Q of the stylus 273.

The W-direction movement detector 274 directly detects inclination θ of the measuring arm 272. A length (L) of the measuring arm 272 and a length (H) of the stylus 273 are already known. (L is a length from the rotation axis 272A of the measuring arm 272 to the base end Q of the stylus 273.) Given this, a conversion formula including the length (L) of the measuring arm 272 and the inclination angle (θ) of the detected measuring arm 272 allow to obtain, from a detection value θ of the W-direction movement detector 274, a W coordinate value of the base end Q ($Q_w$) of the stylus 273. In addition, a conversion formula including the length (L) of the measuring arm 272, the length (H) of the stylus 273, and the detected inclination angle (θ) of the measuring arm allow to obtain, from the detection value θ of the W-direction movement detector 274, a W coordinate value of the forefront end D ($D_w$) of the stylus 273.

$$Q_w = -L \sin \theta$$

$$D_w = -(L \sin \theta + H \cos \theta)$$

Further comments are added here for clarification. FIGS. 1-3 illustrate an example of the measuring arm 272 in a straight line shape and the stylus 273 projecting at a right angle on the forefront end of the measuring arm 272 in the straight line shape. However, the measuring arm 272 and the stylus 273 may also have other shapes. For example, a portion of the measuring arm may be bent in a U-shape as exemplified in FIGS. 4A and 4B.

Even in this case, the measuring arm 272 in the horizontal position is set as the standard position (initial position), an axis parallel to the X axis and passing through the rotation angle 272A is defined as a U axis. An axis parallel to the Z axis and passing through the forefront end D of the stylus 273 when the measuring arm 272 is horizontal is defined as a W axis. At this time, since the point required for measurement is an intersecting point of the U axis and the W axis, the intersecting point of the U axis and the W axis is a point Q. In FIG. 4A, a length from the point Q to the forefront end D of the stylus 273 is defined as H. In FIG. 4B, the forefront end D of the stylus 273 is configured to be placed on the U axis when the measuring arm 272 is in the standard position (initial position, horizontal). In this case, the forefront end D of the stylus 273 matches the point Q, and H is zero in other words.

When a measuring arm in a different shape is used (as shown in FIGS. 4A and 4B), the base end Q of the stylus 273 is not appropriate as a name, and therefore the intersecting point of the U axis and the W axis is called a first principal point Q. In addition, the forefront end D of the stylus 273 is called a second principal point D. Further, since the definition of length (H) of the stylus 273 is not appropriate, the length H from the first principal point Q to the second principal point D (forefront end D of the stylus 273) is called a forefront end projection length H. Furthermore, the length L from the rotation axis 272A to the first principal point Q is called an arm length L.

Also, the W-direction movement detector 274 detects the inclination θ of the measuring arm 272, however, the W-direction movement detector 274 may detect directly or indirectly $Q_w$ or $D_w$, instead of the inclination θ of the measuring arm 272. When one of $Q_w$, $D_w$, and θ is detected directly or indirectly, the remaining two can be obtained from a relational formula.

The measuring force provider 275 is a voice coil motor that is arranged toward the base end of the measuring arm 272, and applies force to the measuring arm 272 such that the forefront end of the measuring arm 272 is biased downward. The measuring force provider 275 is configured with a magnet 275A and a voice coil 275B. The magnet 275A is in a cylindrical shape and provided in a partway of the measuring arm 272. The voice coil 275B is arranged so as to pass through the magnet 275A. The voice coil 275B is provided fixated and may be fixated to the bracket 271, for example. With such a configuration, the measuring force (contact force of the stylus 273 and the measured surface S) is provided and serves as a measuring force provider that adjusts the force.

With the configuration mentioned above, by the relative displacement mechanism 230 (Y-axis drive mechanism 240, Z-axis drive mechanism 250, and X-axis drive mechanism 260), the measuring device 270 can be relatively displaced in a three-dimension with respect to the measured object W. The measuring device 270 performs a scanning displacement along the measured surface S while the stylus 273 is in contact with the measured surface S. The micro vertical movement of the stylus 273 at that point of time is detected by the W-direction movement detector 274 as an amount of oscillation of the measuring arm 272. Accordingly, surface characteristic of the measured object (outline, micro unevenness, roughness, undulation, and the like) are obtained.

Here, the measuring arm 272 of the measuring device 270 must oscillate swiftly according to micro unevenness of the measured surface S. Therefore, the measuring arm 272 cannot be fixatedly supported. The measuring arm 272 is supported in a state where the measuring arm 272 is swingably and axially supported by the rotation axis 272A while keeping a subtle balance with the balance weight 272B, the biasing force from the measuring force provider 275, and a reverse force from the measured surface S. When the stylus 273 is not in contact with the measured surface S, due to the biasing force from the measuring force provider 275, the measuring arm 272 is inclined in a state where the forefront end of the measuring arm 272 is descended.

Next, FIG. 5 illustrates a functional block diagram of the control device 300. The control device 300 includes an interface 310, a central controller 320, a memory 330, a detection circuit portion 340, an operation controller 350, and a measuring force controller 360.

The control device 300 is connected to an external inputter 311 and outputter 312 via the interface 310. As the inputter 311, various data readers may be used besides a keyboard and a mouse. The outputter 312 may be various operation devices, in addition to a display device or a printer, that obtain a shape of the measured object by data operation.

The central controller 320 is a so-called CPU (Central Processing Unit), and integrately manages the entire operation of the control device 300. The memory 330 is ROM or RAM, stores various operation control programs, and also serves as a buffer when data is input/output.

The detection circuit portion 340 detects signals (for example, pulse signals) from the Y direction position detector 241, the Z direction position detector 253, the X-direction position detector 263, and the W-direction movement detector 274; and externally outputs as measurement data via the interface 310.

The operation controller 350 applies a drive signal to the Y-axis drive mechanism 240, Z-axis drive mechanism 250, and the X-axis drive mechanism 260; and performs a scanning displacement of the measuring device 270 along the measured surface S. In other words, the operation controller 350 receives an instruction from the central controller 320 and outputs a drive pulse to Y-axis drive mechanism 240, Z-axis drive mechanism 250, and X-axis drive mechanism 260 respectively.

However, in the surface characteristic measuring apparatus 100, a function to automatically drive the Z-axis drive mechanism 250 and to automatically set the stylus 273 at a measuring start point of the measured object W is incorporated (programmed) in advance (see FIG. 6). In the present specification, this function is referred to as an auto-setting function and a program to execute the auto-setting function is referred to as an auto-setting program. When executing the auto-setting function, the stylus 273 is first arranged to be directly above the measuring start point. In other words, by driving the X-axis drive mechanism 260 and the Y-axis drive mechanism 240 in a state where the Z slider 252 is lifted upward by the Z-axis drive mechanism 250, the stylus 273 is arranged to be directly above the measuring start point. Then, the auto-setting function is executed and the Z slider 252 is slowly descended by the Z-axis drive mechanism 250, and the measuring arm 272 is leveled. In this way, the stylus 273 is automatically set at the measuring start point.

The auto-setting function is convenient, however, has the following concern. See illustration in FIG. 7. When the Z slider 252 is slowly descended by the Z-axis drive mechanism 250, the forefront end D of the stylus 273 comes in contact with the measured surface S (Ps0 in FIG. 7). When the Z slider 252 is further slowly descended by the Z-axis drive mechanism 250 after the forefront end D of the stylus 273 contacting with the measured surface S, the measuring arm 272 is descended and rotation is generated in the measuring arm 272 centered on the rotation axis 272A at the same time. Due to this rotation motion of the measuring arm 272, the forefront end D of the stylus 273 is displaced while the forefront end D is in contact with the measured surface S (arrow A in FIG. 7). There are many occasions where an operator has not taken into account beforehand of the displacement of the stylus 273 on the measured surface S at the time when auto-setting is performed, and therefore an unexpected inconvenience may arise. For example, as exemplified in FIG. 8, when there is a step beside the measuring start point, the stylus 273 may hit the step. When the Z slider 52 continues to descend like this, one of the stylus 273 and the measured object may be broken.

Alternatively, as exemplified in FIG. 9, for example, when the roughness of the measured surface S is large, the large stress may be applied to the stylus 273.

When the forefront end D of the stylus 273 is displaced due to the rotation motion of the measuring arm 272 after the forefront end D of the stylus 273 contacts the measured surface S, the measuring start point may be offset by that amount.

SUMMARY OF THE INVENTION

The present invention provides a control method of a surface characteristic measuring apparatus so as not to displace a forefront end of a stylus when performing an auto-setting.

A control method of a surface characteristic measuring apparatus according to the present invention includes the surface characteristic measuring apparatus provided with a measuring device that measures a surface characteristic of a measured surface by profiling and scanning the measured surface while in contact with the measured surface of a measured object, and a relative displacement mechanism that relatively displaces, three-dimensionally, the measuring device and the measured object such that the measuring device scans and displaces along the measured surface. The measuring device includes a measuring arm supported so as to be capable of performing a circular arc movement with a rotation axis as a fulcrum, a stylus provided to a forefront end of the measuring arm, and a movement detector that detects displacement by the circular arc movement of the measuring arm, and with a vertical direction defined as a Z-axis direction and one direction orthogonal to the Z-axis direction defined as an X-axis direction, the control method of the surface characteristic measuring apparatus, relatively displaces, by the relative displacement mechanism, in the Z-axis direction such that the measuring device and the measured surface approach closely to each other; detects when the forefront end of the stylus is in contact with the measured surface; calculates an amount $\Delta Z_0$ of relative displacement in the Z-axis direction of the measuring device and the measured object that is required for the measuring arm to be leveled after the forefront end of the stylus contacts the measured surface; calculates a displacement amount $\Delta X_0$ in the X-axis direction generated in the forefront end of the stylus when the measuring device and the measured object are relatively displaced by $\Delta Z_0$ in the Z-axis direction; and levels the measuring arm by relatively displacing the measuring device and the measured object only by $\Delta Z_0$ in the Z-axis direction by the relative displacement mechanism, and relatively displaces the measuring device and the measured object only by $\Delta X_0$ in the X-axis direction by the relative displacement mechanism at the same time.

Also, a control method of a surface characteristic measuring apparatus according to the present invention includes the surface characteristic measuring apparatus provided with a measuring device that measures a surface characteristic of a measured surface by profiling and scanning the measured surface while in contact with the measured surface of a measured object, and a relative displacement mechanism that relatively displaces, three-dimensionally, the measuring device and the measured object such that the measuring device scans and displaces along the measured surface. The measuring device includes, a measuring arm supported so as to be capable of performing a circular arc movement with a rotation axis as a fulcrum, a stylus provided to a forefront end of the measuring arm, and a movement detector that detects displacement by the circular arc movement of the measuring arm, and with a vertical direction defined as a Z-axis direction and one direction orthogonal to the Z-axis direction defined as an X-axis direction, the control method of the surface characteristic measuring apparatus, relatively displaces, by the relative displacement mechanism, in the Z-axis direction such that the measuring device and the measured surface approach closely to each other; detects when the forefront end of the stylus is in contact with the measured surface; continues for a predetermined time the relative displacement of the measuring device and the measured surface in the Z-axis direction after the forefront end of the stylus contacts the measured surface; calculates a displacement amount $\Delta X_G$ in the X-axis direction generated in the forefront end of the stylus during the predetermined time; and relatively displaces only by $\Delta X_G$ the measuring device and the measured object in the X-axis direction by the relative displacement mechanism while relatively displacing the measuring device and the measured object in the Z-axis direction by the relative displacement mechanism.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 4A and 4B illustrate a modification of the measuring arm;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
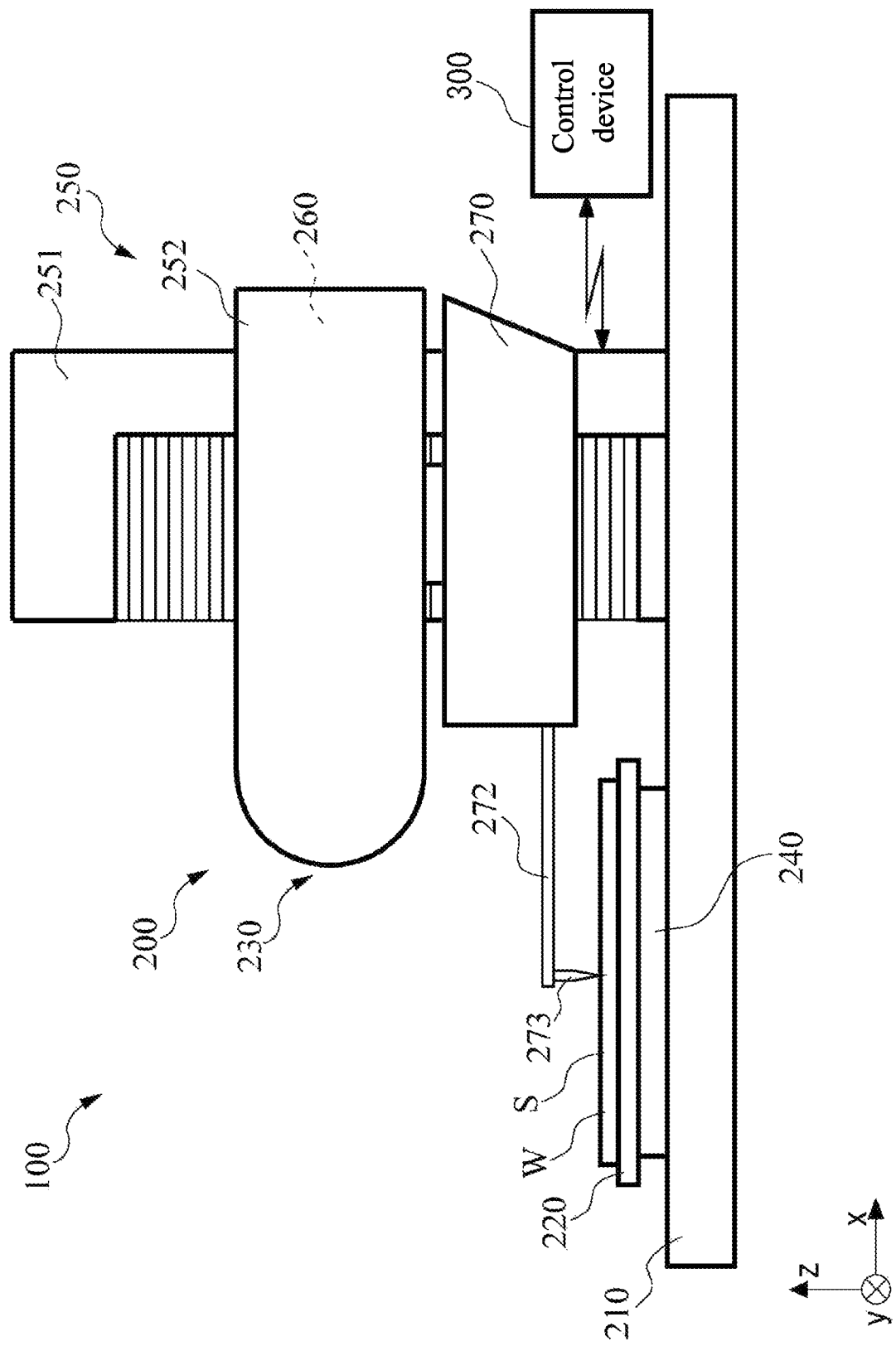
FIG. 1 illustrates a surface characteristic measuring apparatus.
Figure 2:
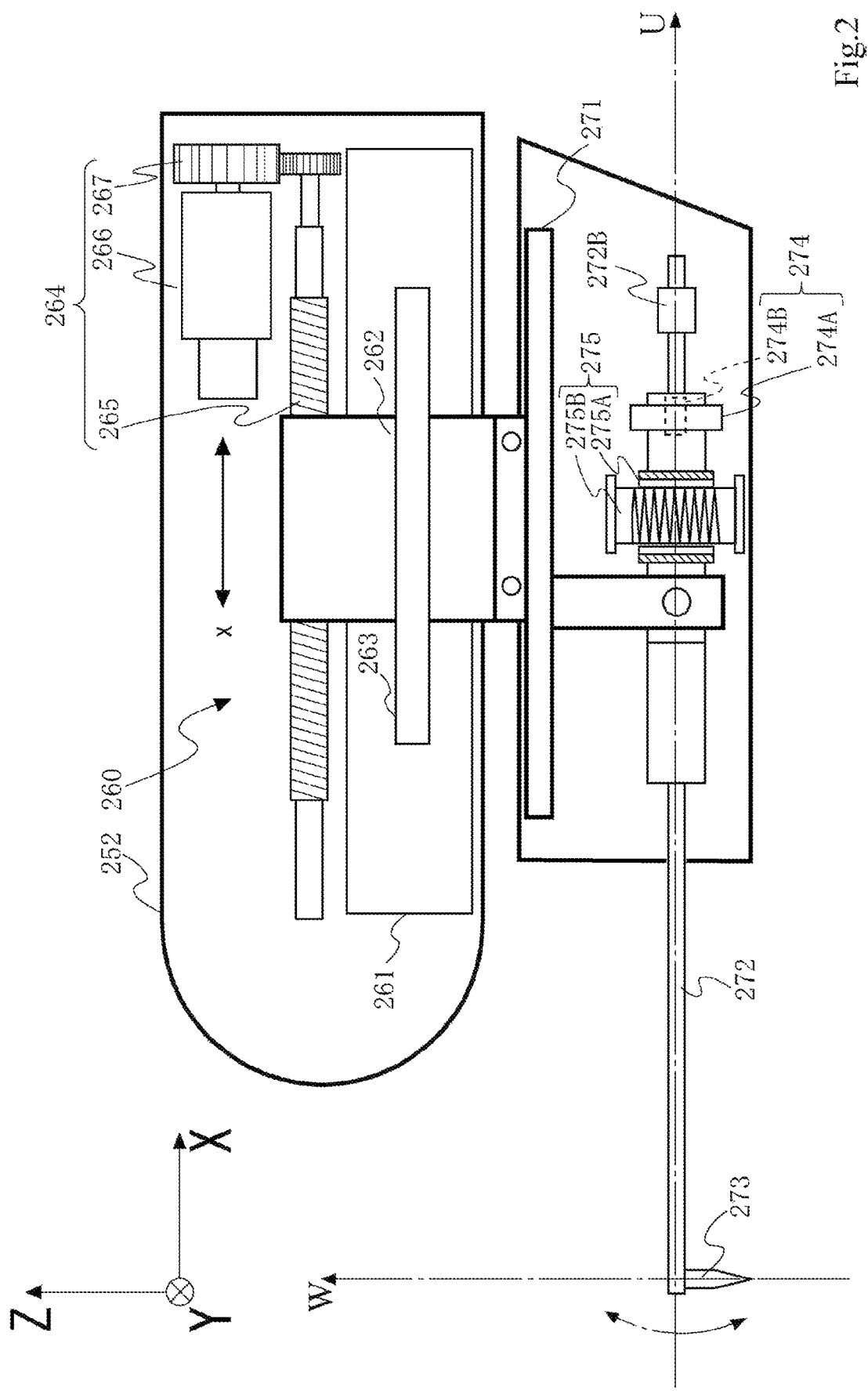
FIG. 2 illustrates a configuration of an X-axis drive mechanism and a measuring device.
Figure 3:
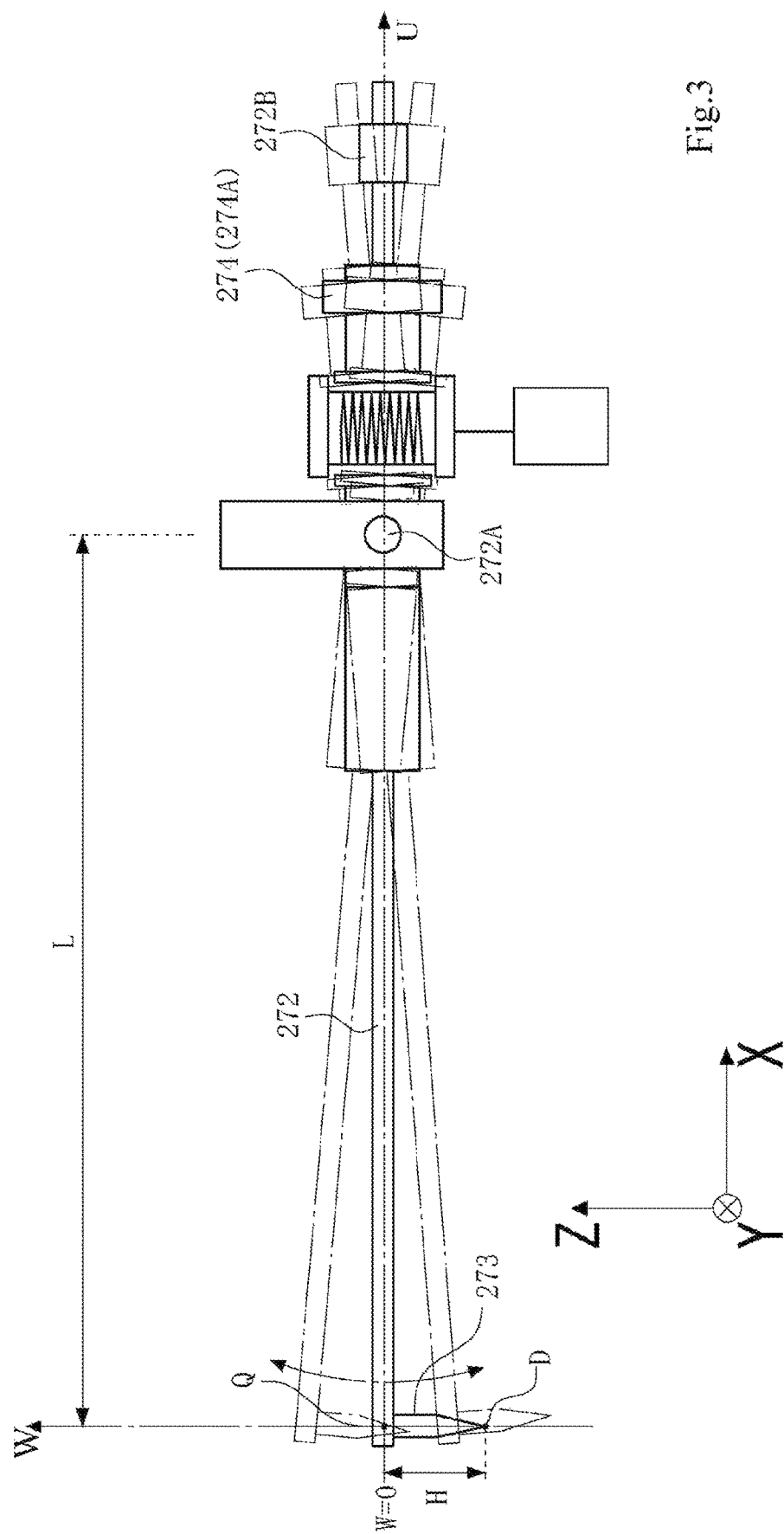
FIG. 3 illustrates a measuring arm.
Figure 5:
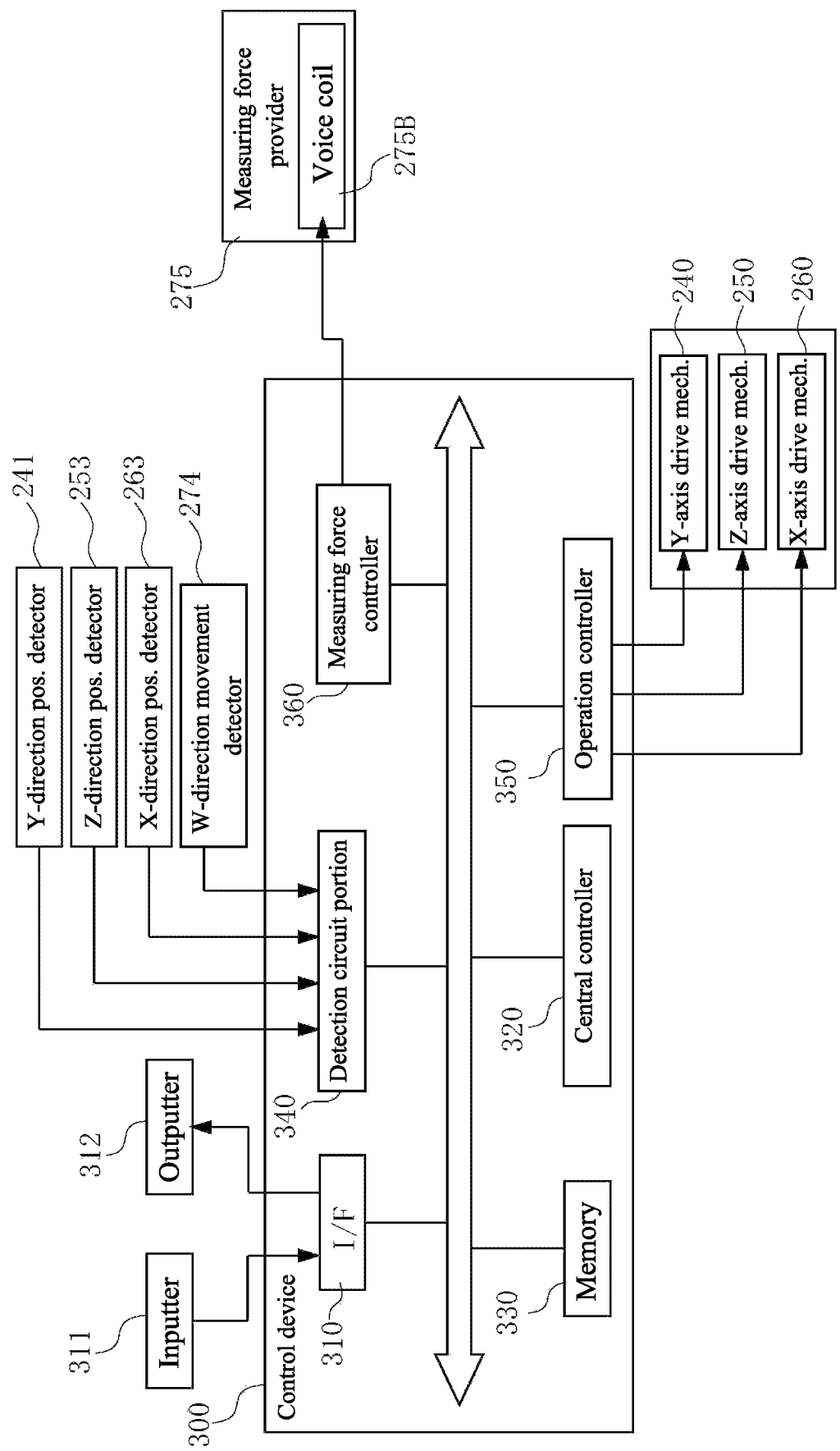
FIG. 5 is a functional block diagram of a control device.
Figure 6:
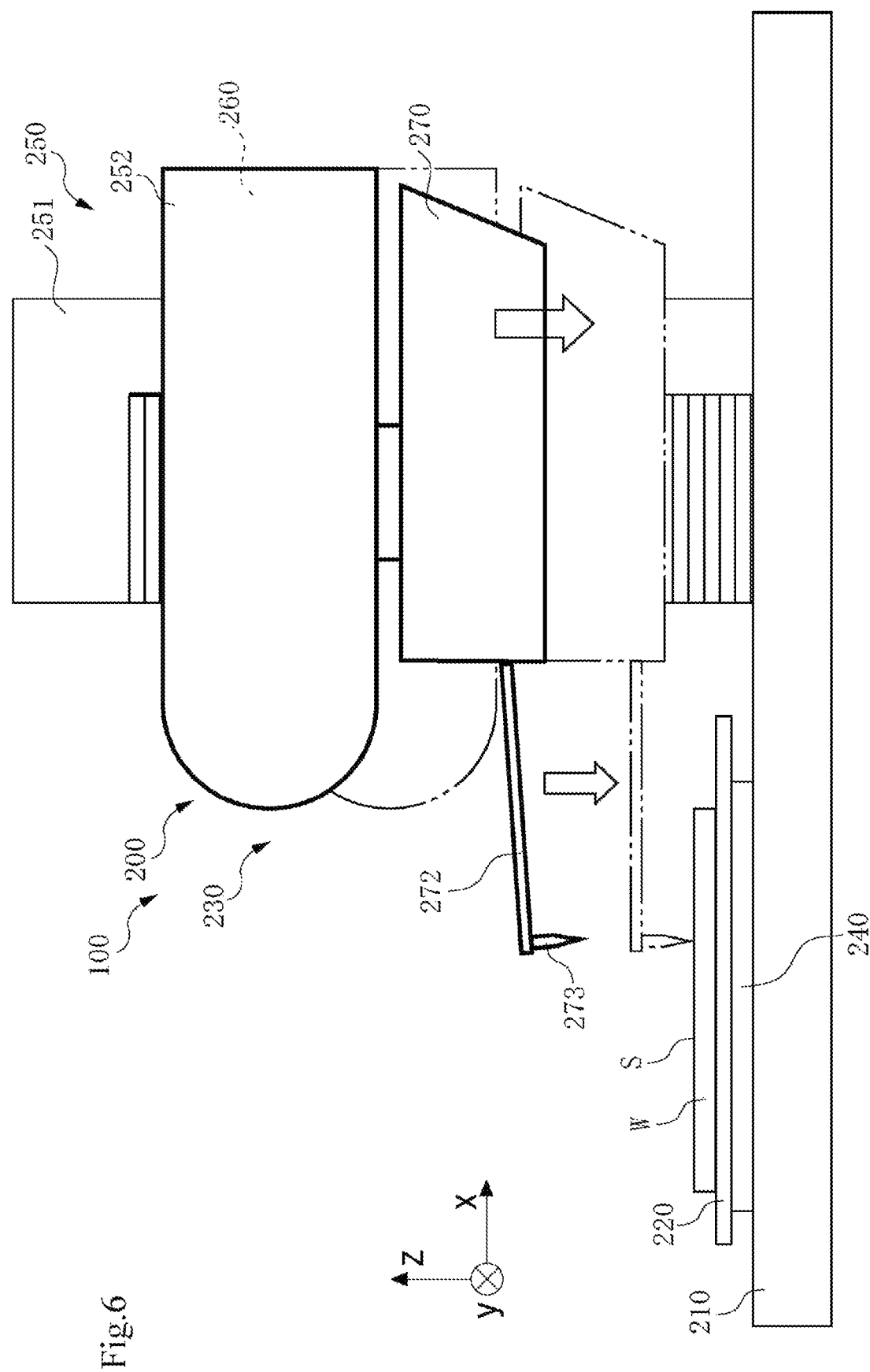
FIG. 6 is an explanatory diagram illustrating an auto-setting function.
Figure 7:
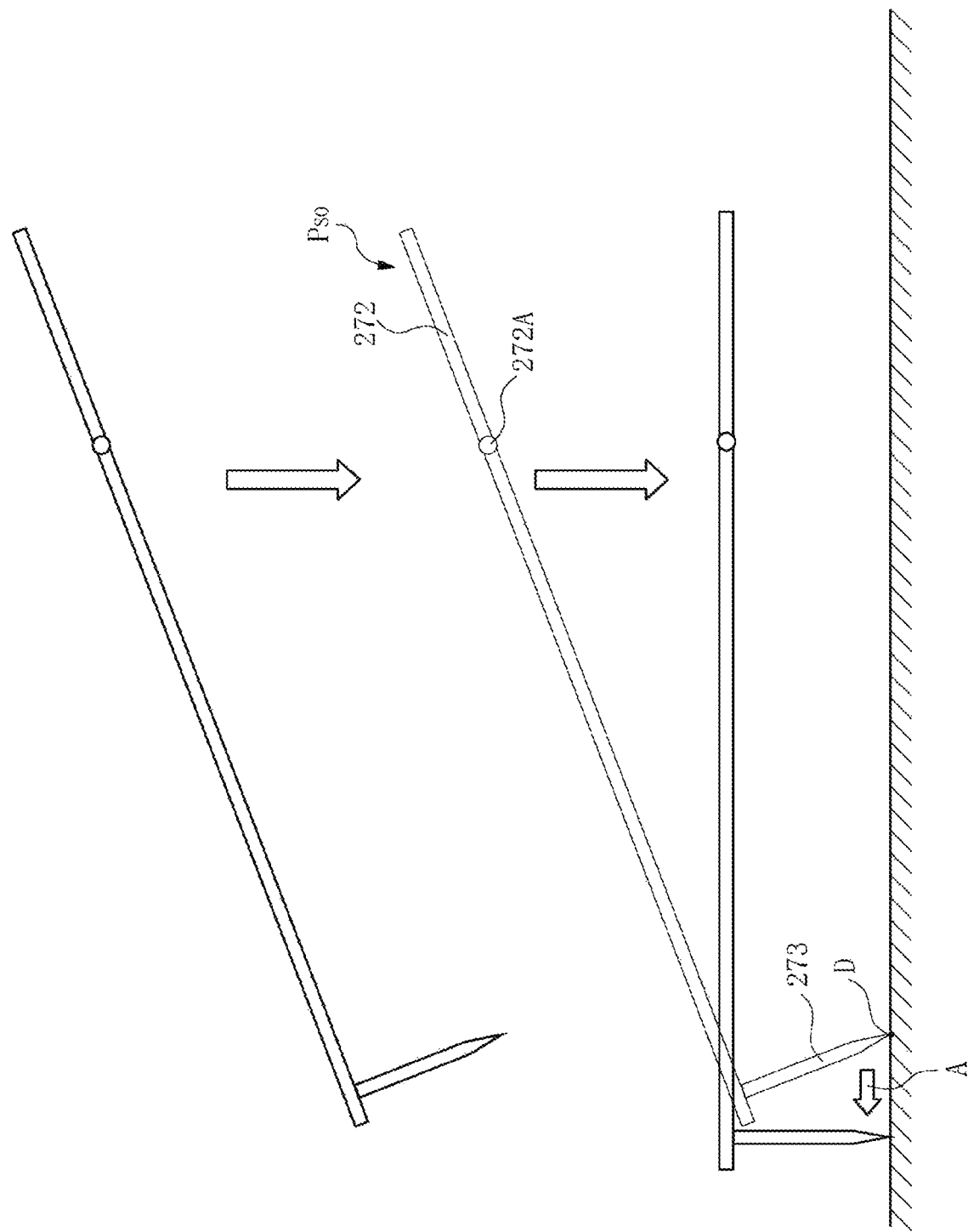
FIG. 7 illustrates an exemplary movement of the measuring arm when an auto-setting is performed.
Figure 8:
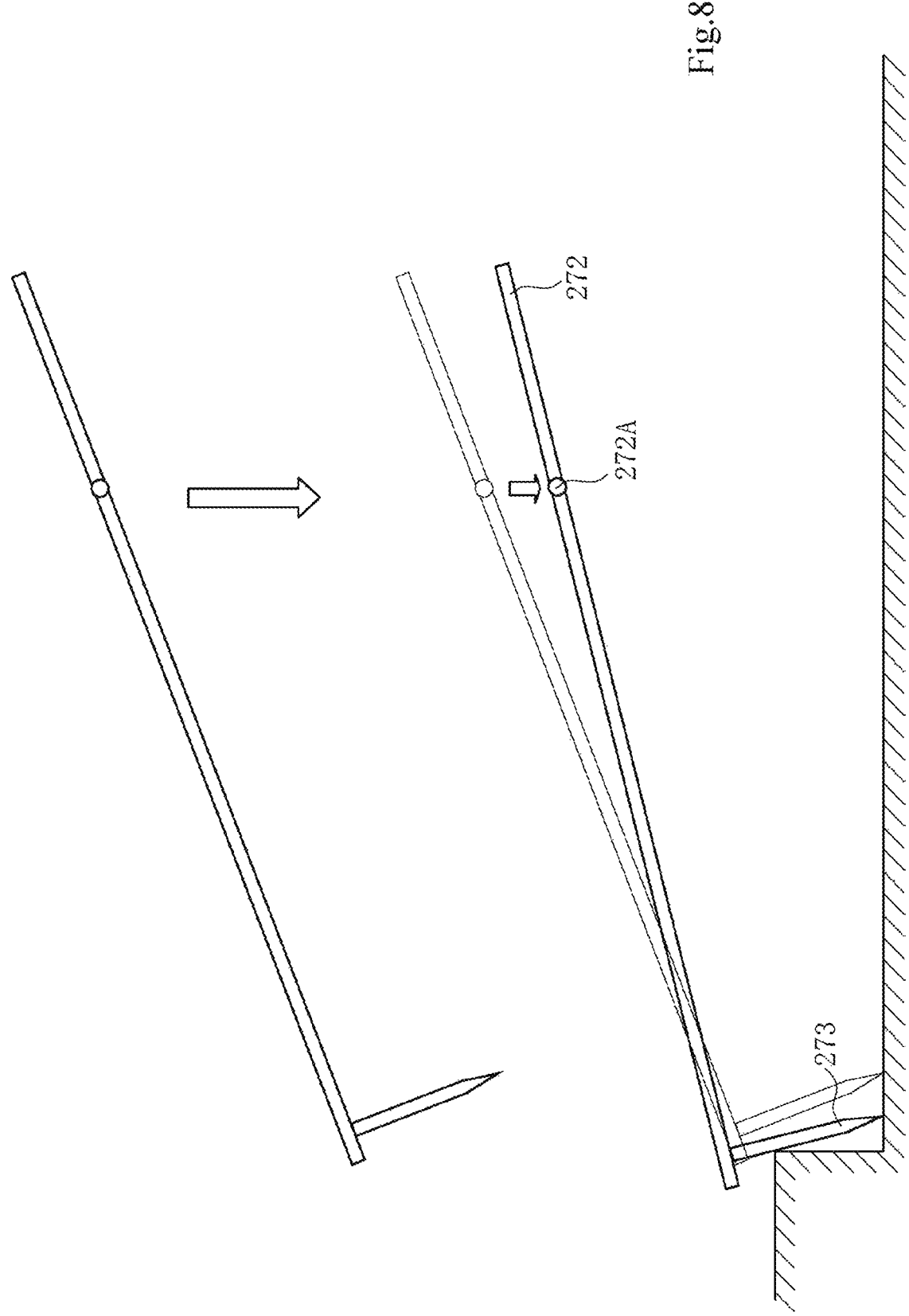
FIG. 8 is an explanatory diagram illustrating an issue when the auto-setting is performed.
Figure 9:
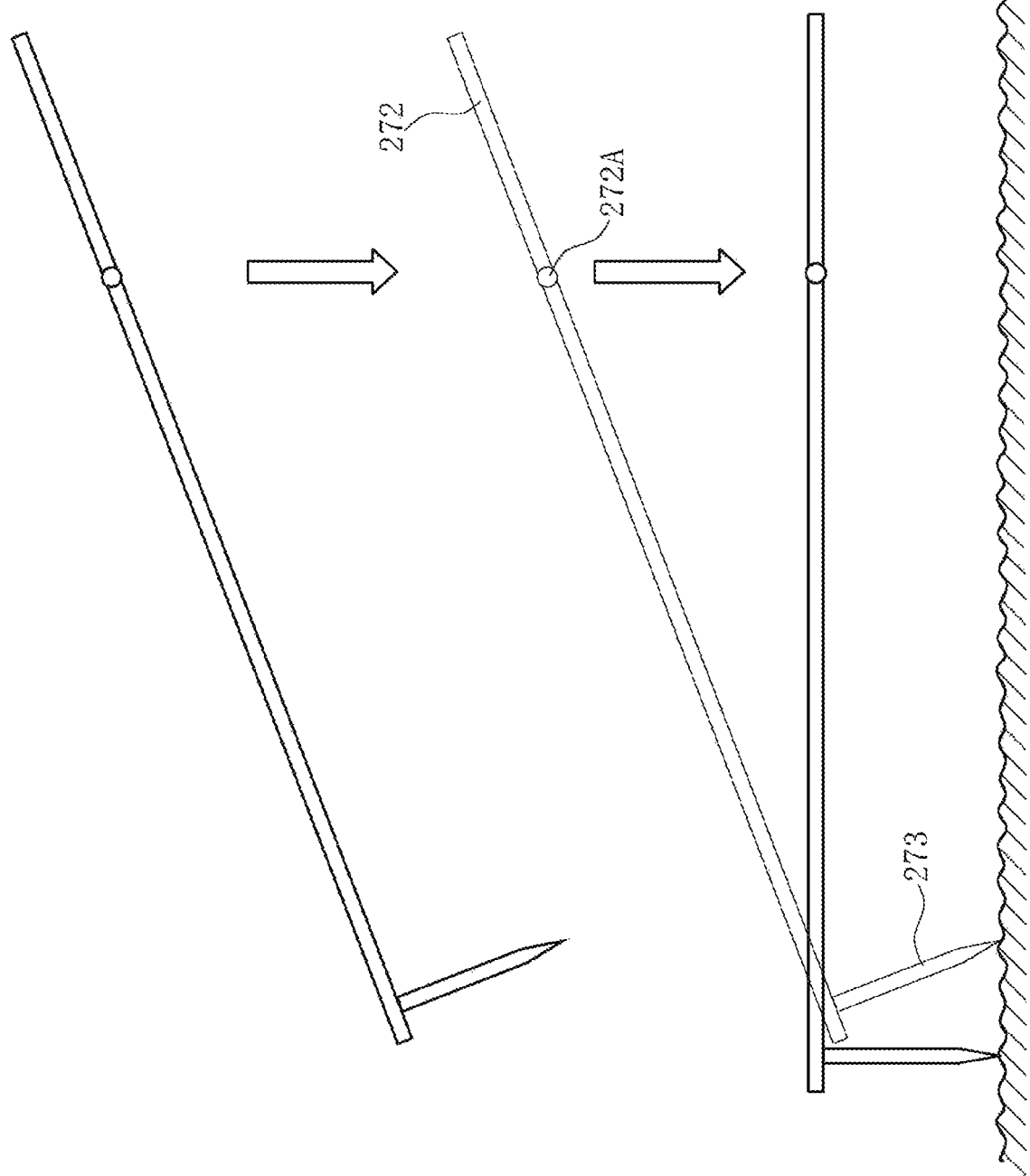
FIG. 9 is an explanatory diagram illustrating an issue when the auto-setting is performed.
Figure 10:
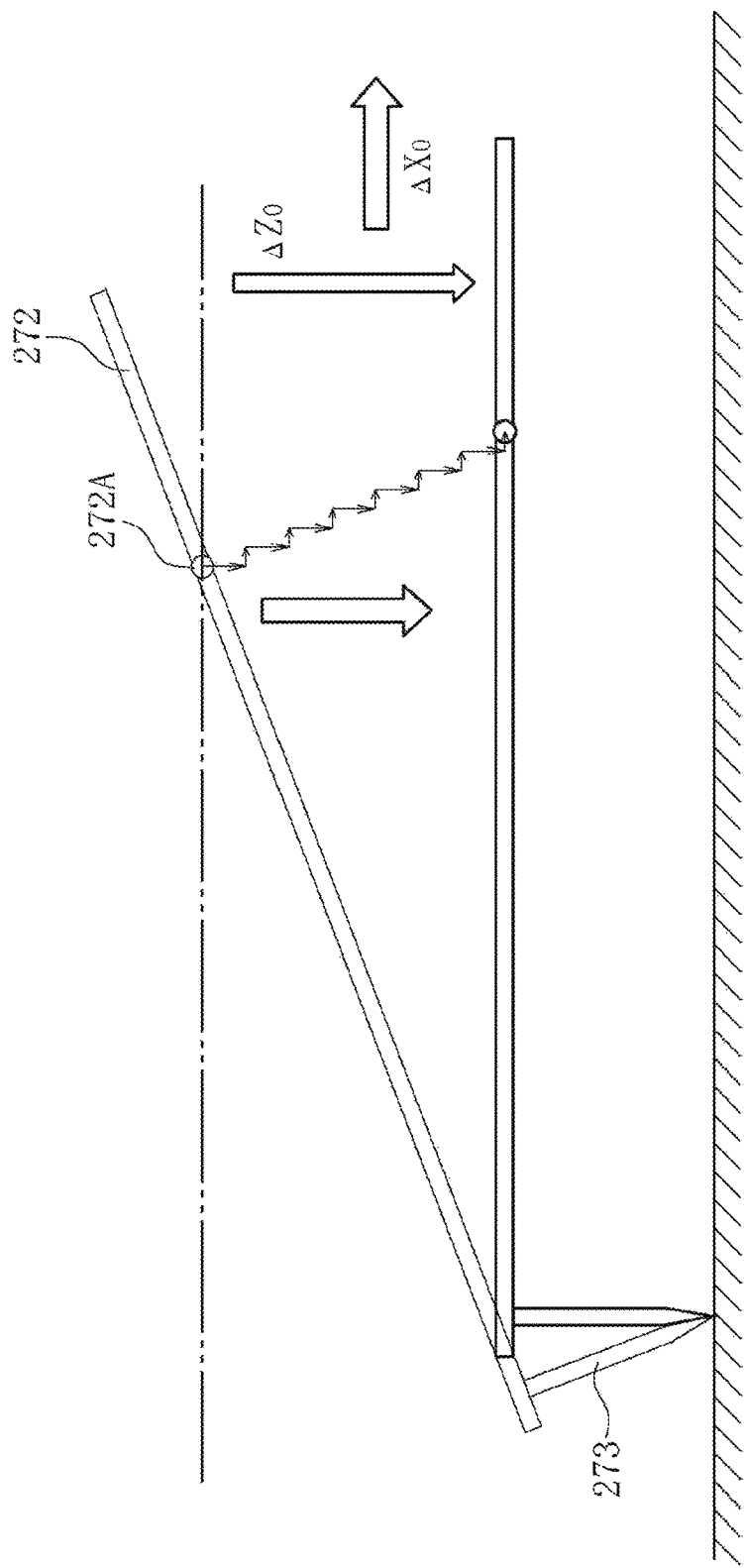
FIG. 10 provides an overview of the present embodiment.
Figure 11:
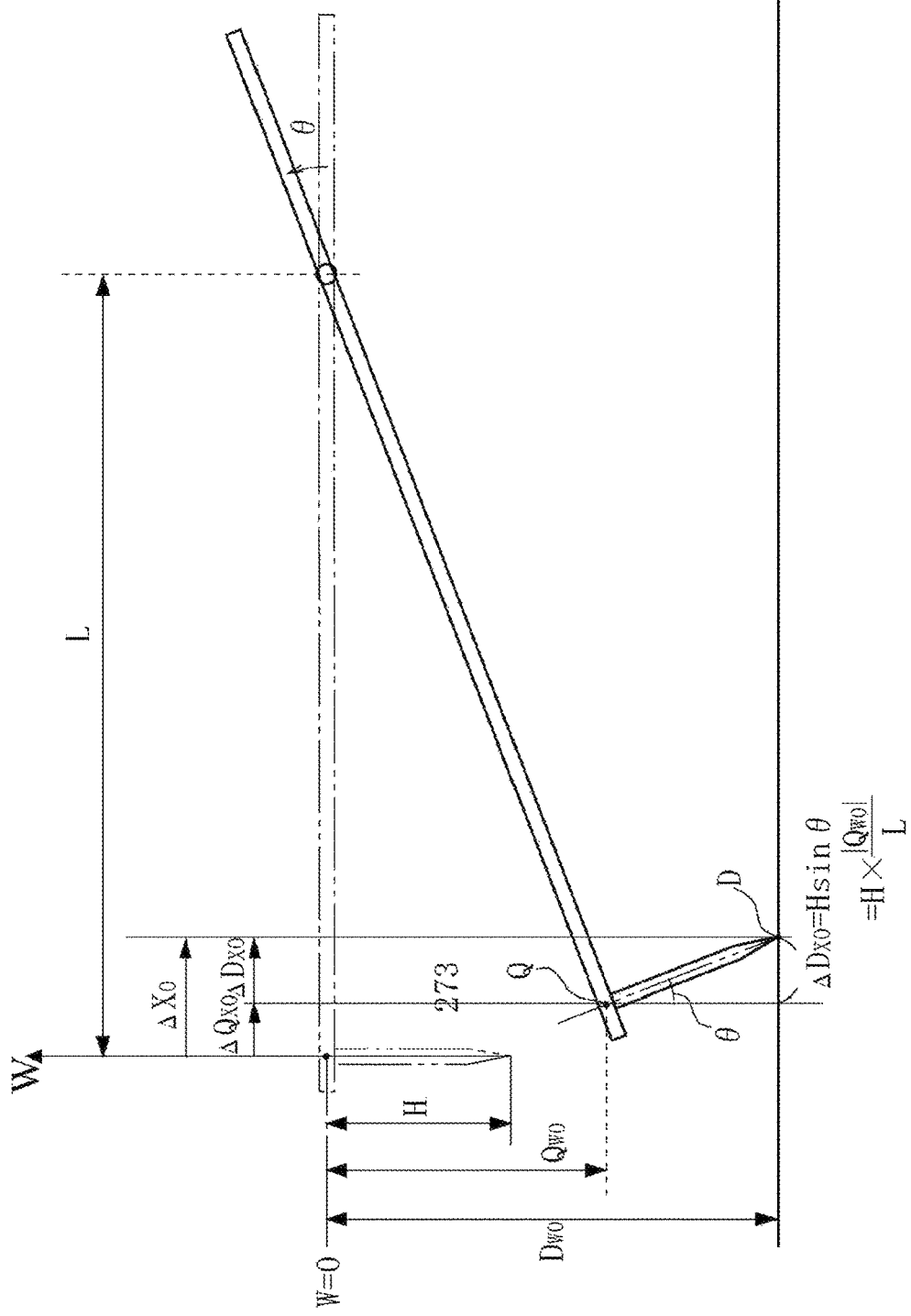
FIG. 11 provides an overview of the present embodiment.

An overview of the present embodiment is first described prior to describing specific embodiments. Please see FIG. 10. A driving amount of a Z-axis drive mechanism 250 necessary to level a measuring arm 272 after a stylus 273 comes in contact with a measured surface/measurable surface S is expressed by $\Delta Z_0$. $\Delta Z_0$ is equal to a descending amount of a forefront (distal) end D of the stylus 273 is descended from an initial position at a moment when a contact between the stylus 273 and a measured surface S is detected (refer to FIGS. 10 and 11). A position $D_w$ of the forefront end D of the stylus 273 is obtained from a tilted angle θ of the measuring arm detected by a W-direction movement detector 274. A position of the forefront end D of the stylus at a moment when the stylus 273 contacting the measured surface S is expressed by $D_{w0}$. (In this example, $D_{w0}$ is a negative number.) The driving amount $\Delta Z_0$ of the Z-axis drive mechanism 250 necessary to level a measuring arm 272 is expressed as:

$$\Delta Z_0 = D_{w0} + H$$

In this example, H is a length of the stylus 273.

$D_{w0}$ is obtained by a conversion formula using the tilted angle θ of the measuring arm 272 at the moment when the stylus 273 is in contact with the measured surface S and the length L from the rotation axis 272A of the measuring arm 272 to a first principal point Q (base end Q of the stylus 273). $D_{w0} = -(L \sin θ_0 + H \cos θ_0)$ and $\Delta Z_0$ being a negative number express that the Z-axis drive mechanism 250 drives downward.

Next, driving of the X-axis drive mechanism 260 is considered. A displacement in an X-axis direction is generated in a second principal point D (forefront end D of the stylus 273) by rotating the measuring arm 272 and the stylus 273 since the stylus 273 comes in contact with the measured surface S until the measuring arm 272 is leveled. First, a displacement in the X-axis direction generated in the first principal point Q (base end Q of the stylus 273) by the rotation of the measuring arm 272 is defined as $\Delta Q_{x0}$. Also, a displacement in the X-axis direction generated in the second principal point D (base end Q of the stylus 273) by the rotation of the measuring arm 273 is defined as $\Delta D_{x0}$. $\Delta Q_{x0}$ and $D_{x0}$ are respectively obtained from the relationship illustrated in FIG. 11 and $\Delta X_0$ is obtained by adding both.

$$\Delta X_0 = \Delta Q_{x0} + \Delta D_{x0} \qquad \text{[Formula 1]}$$
$$= (L - L\cos θ_0) + H\sin θ_0$$

Here, a position $Q_{w0}$ of the first principal point Q (base end Q of the stylus 273) at the moment when the stylus 273 is in contact with the measured surface 273 is expressed by using the tilted angle θ of the measuring arm 272 at the moment when the stylus 273 is in contact with the measured surface S, and the length L (arm length Q) from the rotation axis 272A of the measuring arm 272 to the first principal point Q (base end Q of the stylus 273).

$$Q_{w0} = -L \sin θ_0$$

Therefore, $\Delta X_0$ of the formula above can be modified as follows.

$$\Delta X_0 = \Delta Q_{x0} + \Delta D_{x0} \qquad \text{[Formula 2]}$$
$$= (L - L\cos θ_0) + H\sin θ_0$$
$$= \left(L - L\sqrt{1 - \frac{Q_{w0}^2}{L^2}}\right) + H \cdot \frac{|Q_{w0}|}{L}$$
$$= \left(L - \sqrt{L^2 - Q_{w0}^2}\right) + H \cdot \frac{|Q_{w0}|}{L}$$
$$= \left(L - \sqrt{L^2 - Q_{w0}^2}\right) - H \cdot \frac{Q_{w0}}{L}$$

Since $Q_{w0}$ is a negative number, a mathematical sign before $Q_{w0}$ is adjusted such that $\Delta X_0$ is a positive number.

The Z slider 252 is displaced downward by $\Delta Z_0$ by the Z-axis drive mechanism 250 since the stylus 273 comes in contact with the measured surface S to the measuring arm 272 is leveled. During this time, a measuring device is simultaneously displaced by $\Delta X_0$ in the X direction by the X-axis drive mechanism. In other words, the measuring device is displaced and the auto-setting is performed not only in the Z direction but also in the X direction. As exemplified in FIG. 10, the auto-setting is completed without the second principal point D (forefront end D of the stylus 273) being displaced after the stylus 273 contacts the measured surface S.

A description of embodiments of the present invention is given with reference to the drawings and to the reference numerals assigned to each component in the drawings.

First Embodiment

Figure 12:
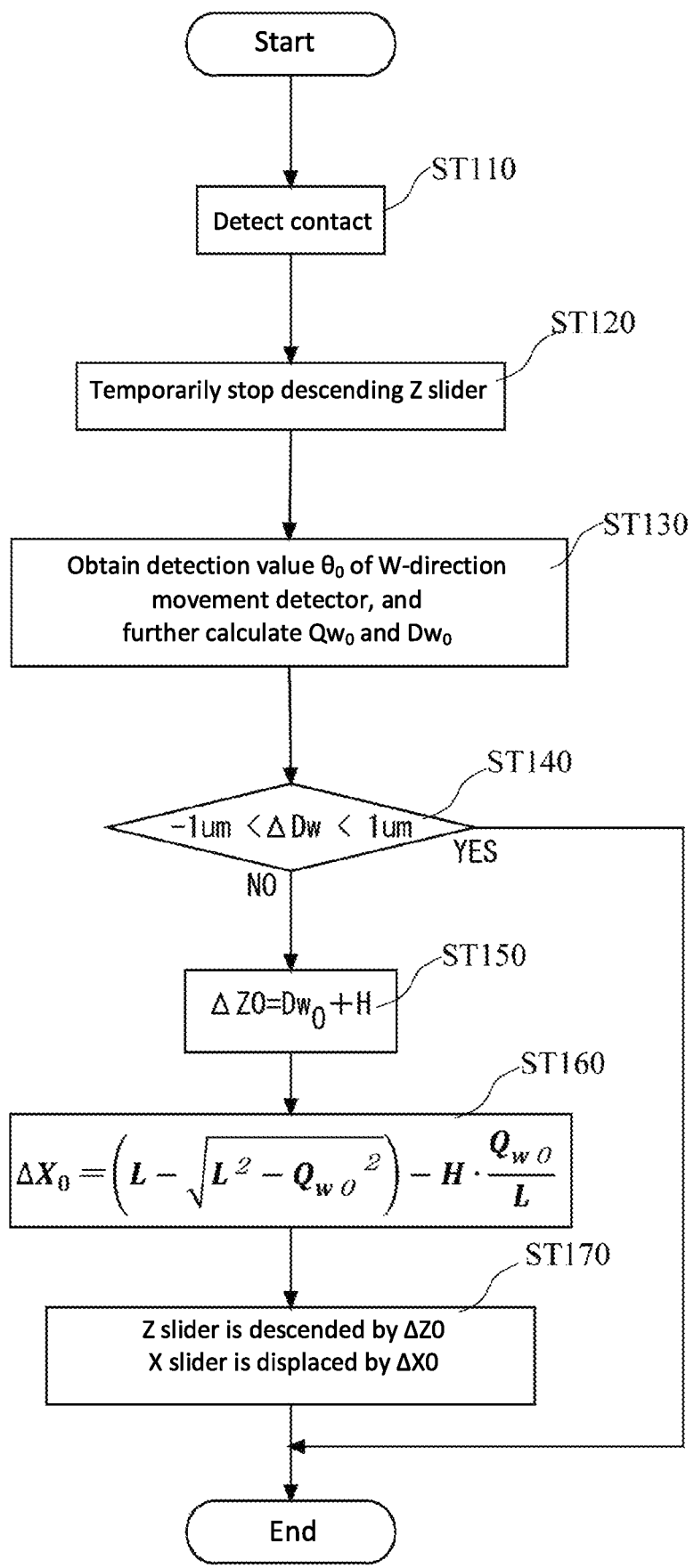
FIG. 12 is a flow chart describing a first embodiment.

FIG. 12 is a flow chart describing a first embodiment according to the present invention. The control operation is achieved by executing an auto-setting program stored in a memory 330 using a central controller 320, for example. In the auto-setting function, after the stylus 273 is arranged directly above a measuring start point, the Z slider 252 is slowly descended by the Z-axis drive mechanism 250 and the stylus 273 and a measured object/measurable object W come into contact. The contact between the stylus 273 and the measured object W is detected by 3 the W-direction movement detector 274 (ST110).

When the contact between the stylus 273 and the measured object W is detected (ST110), at this time, descending the Z slider 252 is temporarily stopped (ST120). Then, a detection value $\theta_0$ of the W-direction movement detector 274 at the time is obtained (ST130). Further, using the detection value $\theta_0$, a W coordinate value $Q_{w0}$ of the first principal point Q (base end Q of the stylus 273) and a W coordinate value $D_{w0}$ of the second principal point D (forefront end D of the stylus 273) are calculated (ST130).

When the measuring arm 272 is inclined from the horizontal position, the measuring arm 272 must be leveled by descending the Z slider 252. The measuring arm 272 is determined whether or not inclined. In this example, the determination whether the measuring arm 272 is inclined is performed by using the W coordinate value $D_{w0}$ of the second principal point D (forefront end D of the stylus 273). In other words, a W coordinate value of the second principal point D (forefront end D of the stylus 273) when the measuring arm 272 is leveled is expressed as $D_{w1}$ and a difference between the W coordinate value $D_{w0}$ of the second principal point D (Forefront end D of the stylus) and this $D_{w1}$ noted above is defined as an inclination index value $\Delta D_w$.

$$\Delta D_w = D_{w1} - D_{w0}$$

The inclination index value $\Delta D_w$ is equivalent to the inclination of the measuring arm 272 in other words. When the inclination index value $\Delta D_w$ exceeds ±1 micrometer (ST140: NO), the measuring arm 272 is determined to be inclined. Therefore, the measuring arm 272 must be leveled by further descending the Z slider 252.

A descending amount $\Delta Z_0$ of the Z slider 252 necessary to level the measuring arm 272 is defined as $\Delta Z_0$. As described above, the descending amount $\Delta Z_0$ of the Z slider 252 that is necessary to level the measuring arm 272 is "$D_{w0}$+H", so $\Delta Z_0 = D_{w0} + H$ is set (ST150).

When the Z slider 252 is descended only by $\Delta Z_0$ till the measuring arm 272 is leveled, displacement in the X-axis direction generated in the second principal point D (forefront end D of the stylus 273) is defined as $\Delta X_0$. As described above, $\Delta X_0$ is $\Delta Q_{x0} + \Delta D_{x0} = (L - L \cos\theta_0 + H \sin\theta_0)$. When $Q_{w0}$ is used, $\Delta X_0$ is expressed as below (ST160).

$$\Delta X_0 = \Delta Q_{x0} + \Delta D_{x0} \quad [\text{Formula 3}]$$

$$= \left(L - \sqrt{L^2 - Q_{w0}^2}\right) - H \cdot \frac{Q_{w0}}{L}$$

Since $\Delta Z_0$ and $\Delta X_0$ are obtained in this way, the X slider 262 is displaced while the Z slider 252 is descended and the measuring arm 272 is leveled (ST170). In other words, the Z slider is descended only by $\Delta Z_0$ and the X slider 262 is displaced only by $\Delta X_0$. As exemplified in FIG. 10, the auto-setting is completed without the second principal point D (forefront end D of the stylus 273) being displaced after the stylus 273 contacts the measured surface S.

Second Embodiment

Figure 13:
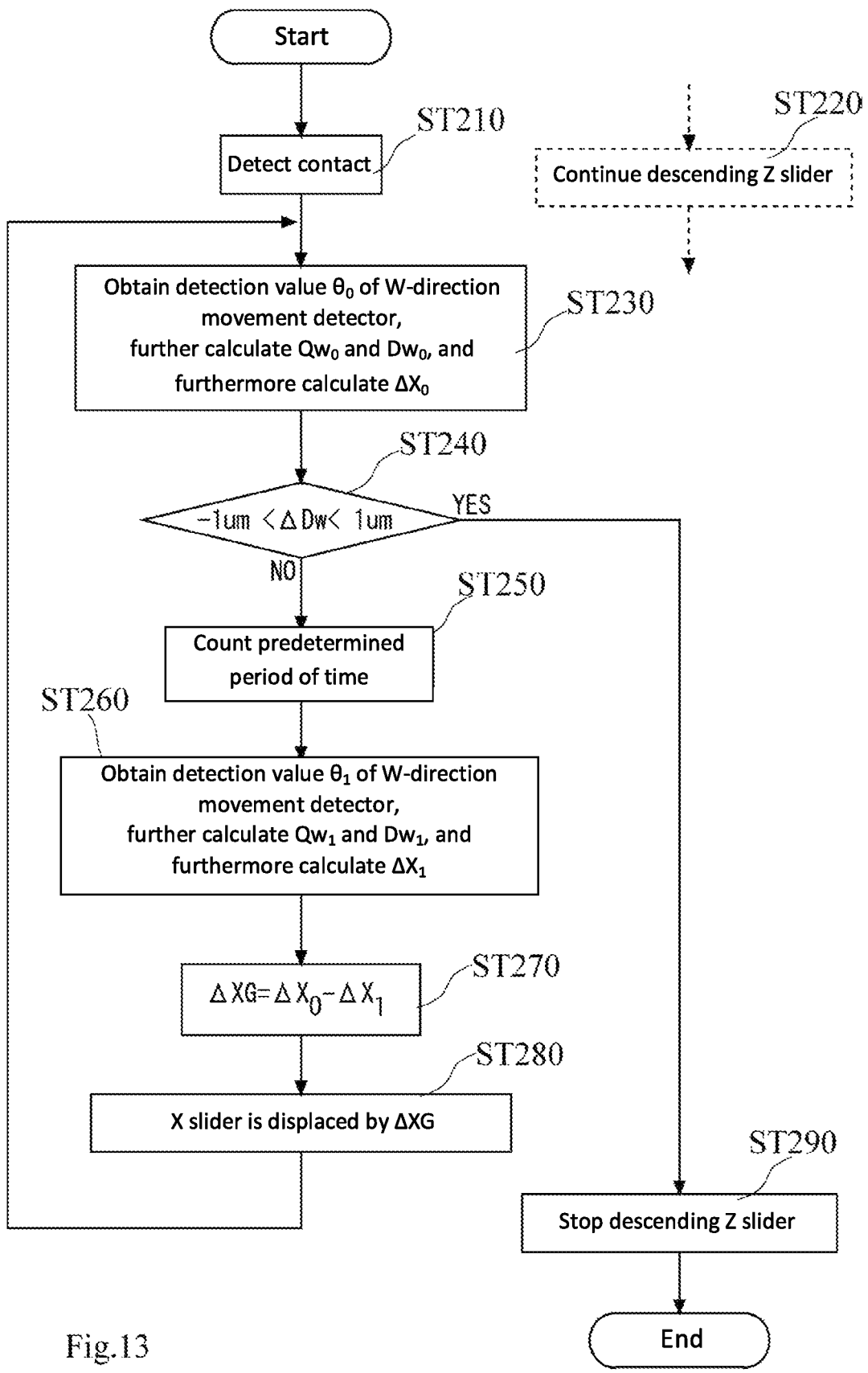
FIG. 13 is a flow chart describing a second embodiment.

A description of a second embodiment follows. The basic configuration of the second embodiment is similar to the first embodiment, however, in the second embodiment, while descending the Z slider, displacement of the X slider is compensated according to an actual descending amount of the Z slider. FIG. 13 is a flow chart describing a second embodiment. In the auto-setting function, after the stylus 273 is arranged directly above a measuring start point, the Z slider 252 is slowly descended by the Z-axis drive mechanism 250 and the stylus 273 and the measured object W come into contact. The contact between the stylus 273 and the measured object W is detected by the W-direction movement detector 274 (ST210).

When the contact between the stylus 273 and the measured object W is detected (ST210), in the second embodiment, the Z slider 252 continues to descend (ST220). Simultaneously, when the contact between the stylus 273 and the measured object W is detected (ST210), a detection value $\theta_0$ of the W-direction movement detector 274 at the time is obtained (ST230). Then, the W coordinate value $Q_{w0}$ of the first principal point Q (base end Q of the stylus 273) and the W coordinate value $D_{w0}$ of the second principal point D (forefront end D of the stylus 273) are calculated. Further, in the second embodiment, $\Delta X_0$ is calculated using the detection value $\theta_0$ (ST230). In other words, when the Z slider 252 is temporarily descended (only by $\Delta Z_0$) from the current point in time until the measuring arm 272 is leveled, displacement $\Delta X_0$ in the X-axis direction generated in the second principal point D (forefront end D of the stylus 273) is obtained.

Determination is made whether or not the inclination index value $\Delta D_w$ exceeds ±1 micrometer, and when the inclination index value $\Delta D_w$ exceeds ±1 micrometer (ST240: NO), the measuring arm 272 is determined to be inclined. In this case, the measuring arm 272 must be leveled by further descending the Z slider 252. Given this, a predetermined period of time (one second, for example) is counted (ST250). During this time, the Z slider continues to descend.

After the predetermined period of time has elapsed, a detection value $\theta_1$ of the W-direction movement detector 274 is obtained again (ST260). Then, at this point, W coordinate value $Q_{w1}$ of the first principal point Q (base end Q of the stylus 273) and W coordinate value $D_{w1}$ of the second principal point D (forefront end D of the stylus 273) are calculated. Further, $\Delta X_1$ at this point is calculated using the detection value $\theta_1$ (ST260). In other words, when the Z slider 252 is temporarily descended (only by $\Delta Z_1$) from the current point in time until the measuring arm 272 is leveled, displacement $\Delta X_1$ in the X-axis direction generated in the second principal point D (forefront end D of the stylus 273) is obtained.

The difference between the previous $\Delta X_0$ and the current $\Delta X_1$ after elapsing the predetermined period of time is defined as $\Delta X_G$ (ST270).

$$\Delta X_G = \Delta X_0 - \Delta X_1$$

This $\Delta X_G$ refers to the displacement of the second principal point D (forefront end D of the slider 273) generated by descending the Z slider for a predetermined period of time. In ST280, the X slider 262 is displaced by $\Delta X_G$.

The movement of the second principal point D (forefront end D of the stylus 273) generated by descending the Z slider 252 is canceled out by the displacement of the X slider, and therefore, the second principal point D (forefront end D of the stylus 273) hardly moves.

Then, returning to the loop of the flow chart, the control loop (ST230-ST280) is repeated until the inclination index value $\Delta D_w$ is in a range of ±1 micrometer (S240: YES). When the inclination index value $\Delta D_w$ is in the range of ±1 micrometer (S240: YES), descending of the Z slider is halted (ST 290) and the auto-setting is completed. As exemplified in FIG. 10, the auto-setting is completed without the second principal point D (forefront end D of the stylus 273) being displaced after the stylus 273 contacts the measured surface S.

There is a difference in drive speed between the Z-axis drive mechanism 250 and the X-axis drive mechanism 260 and synchronizing both movements is simply difficult. Therefore, in the first embodiment, when the speed of the Z-axis drive mechanism 250 is faster or slower than the speed of the X-axis drive mechanism 260, the displacement of the second principal point D (forefront end D of the stylus 273) may increase. In this regard, according to the second embodiment, since the adjustment cycle is repeated every predetermined time (ST230-ST280), the displacement of the second principal point D (forefront end D of the stylus 273) does not increase.

Third Embodiment

Figure 14:
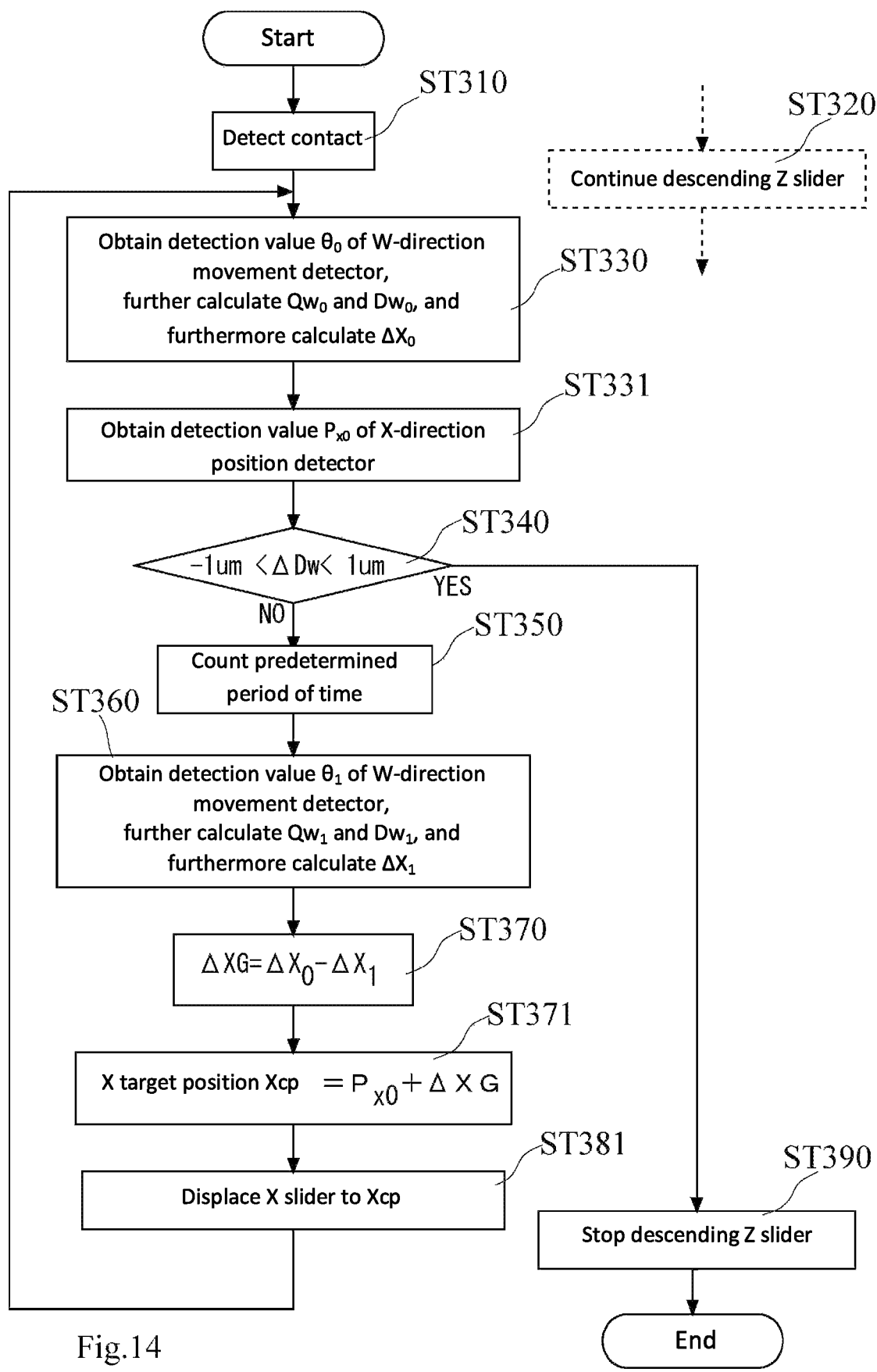
FIG. 14 is a flow chart describing a second embodiment.

A description of a third embodiment follows. The basic configuration of the third embodiment is common to the second embodiment, however, in the third embodiment, a coordinate value of a target position is provided for drive control of the X-axis drive mechanism. FIG. 14 is a flow chart describing a third embodiment. In the flow chart in FIG. 14, a corresponding step number (the lower two digits are the same and 200s is changed to 300s) given to a step performing the identical process with the flow chart in FIG. 13 (second embodiment), and a redundant description thereof is omitted. A description on dissimilar features from the second embodiment (FIG. 13) follows.

In the flow chart in FIG. 14, when the Z slider 252 is descended and the contact between stylus 273 and the measured object W is detected (ST310), a detection value $\theta_0$ of the W-direction movement detector 274 at the time is obtained (ST330). Simultaneously, the detection value $P_{X0}$ of an X-direction position detector 263 at the time is obtained (ST331). After this, descending the Z slider continues, and the difference between the previous $\Delta X_0$ and the $\Delta X_1$ after elapsing the predetermined period of time is obtained as $\Delta X_G$ for every predetermined time (ST370).

A target position $X_{cp}$ of the X-axis drive mechanism is obtained to drive the X slider by $\Delta X_G$. The target position $X_{cp}$ is a sum of $P_{X0}$ obtained in ST331 and the previously noted $\Delta X_G$ (ST371). The target position $X_{cp}$ is provided to the X-axis drive mechanism and the X slider is displaced to the target position $X_{cp}$ (ST381).

Then, returning to the loop of the flow chart, the control loop (ST330-ST380) is repeated until the inclination index value $\Delta D_w$ is in the range of ±1 micrometer (S340: YES). When the inclination index value $\Delta D_w$ is in the range of ±1 micrometer (S340: YES), descending the Z slider is halted (ST390) and the auto-setting is completed. As exemplified in FIG. 10, the auto-setting is completed without the second principal point D (forefront end D of the stylus 273) being displaced after the stylus 273 contacts the measured surface S.

In the second embodiment, the relative displacement is performed providing a drive pulse for a displacement amount $\Delta X_G$ required for drive control of the X slider. In this case, when the control loop (ST230-ST280) is repeated, a cumulative error may be large. In this regard, in the third embodiment, the target position $X_{cp}$ is provided to drive control the X-axis drive mechanism, and therefore, a degree of positioning accuracy of the X slider is high.

Moreover, the present invention is not limited to the embodiments described above, and may be modified as needed without departing from the scope of the present invention. In the embodiments described above, the stylus is installed facing downward and a description is provided which the measuring device is descended from top to bottom when the auto-setting is performed. On the contrary, there may be a case where the stylus is installed facing upward and the measuring device rising from bottom to top when the auto-setting is performed. (For example, a surface facing down may be measured). Even in this case, the present invention can be similarly applied.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A control method of a surface characteristic measuring apparatus, the surface characteristic measuring apparatus including:
   a measuring device that measures a surface characteristic of a measurable surface by profiling and scanning the measurable surface while in contact with the measurable surface of a measurable object; and
   a relative displacement mechanism that relatively displaces, three-dimensionally, the measuring device and the measurable object such that the measuring device scans and displaces along the measurable surface,
   the measuring device including:
   a measuring arm supported so as to be capable of performing a circular arc movement with a rotation axis as a fulcrum;
   a stylus provided to a distal end of the measuring arm; and
   a movement detector that detects displacement by the circular arc movement of the measuring arm, and
   with a vertical direction defined as a Z-axis direction and one direction orthogonal to the Z-axis direction defined as an X-axis direction, the control method of the surface characteristic measuring apparatus comprising:

relatively displacing, by the relative displacement mechanism, the measuring device and the measurable object in the Z-axis direction such that the measuring device and the measurable surface approach each other;

detecting when the distal end of the stylus is in contact with the measurable surface;

calculating an amount $\Delta Z_0$ of relative displacement in the Z-axis direction of the measuring device and the measurable object that is required for the measuring arm to be leveled after the distal end of the stylus contacts the measurable surface;

calculating a displacement amount $\Delta X_0$ in the X-axis direction generated in the distal end of the stylus when the measuring device and the measurable object are relatively displaced by $\Delta Z_0$ in the Z-axis direction; and leveling the measuring arm by relatively displacing the measuring device and the measurable object only by $\Delta Z_0$ in the Z-axis direction by the relative displacement mechanism, and relatively displacing the measuring device and the measurable object only by $\Delta X_0$ in the X-axis direction by the relative displacement mechanism at the same time.

2. The control method of the surface characteristic measuring apparatus according to claim 1, wherein:

an axis parallel to the X axis and passing through the rotation axis is defined as a U axis, an axis parallel to the Z-axis and passing through the distal end of the stylus when the measuring arm is leveled is defined as a W axis, an intersection point of the U axis and the W axis is defined as a first principal point Q, the distal end of the stylus is defined as a second principal point D, a length H from the first principal point Q to the second principal point D is defined as a distal end projection length H, a length L from the rotation axis to the first principal point Q is defined as an arm length L, and wherein when a W coordinate value of the first principal point Q when the second principal point D comes into contact with the measurable surface is defined as $Q_{w0}$, and the W coordinate value of the second principal point D is defined as $D_{w0}$, the $\Delta Z_0$ is expressed as $D_{w0}+H$, and the $\Delta X_0$ is obtained by the following formula:

$$\Delta X_0 = \left(L - \sqrt{L^2 - Q_{w0}^2}\right) - H \cdot \frac{Q_{w0}}{L}. \quad \text{[Formula 4]}$$

3. The control method of the surface characteristic measuring apparatus according to claim 2, further comprising temporarily stopping the relative displacement between the measuring device and the measurable surface when the detecting detects that the distal end of the stylus has contacted the measurable surface, the relative displacement between the measuring device and the measurable surface is temporarily stopped.

4. The control method of the surface characteristic measuring apparatus according to claim 1, further comprising temporarily stopping the relative displacement between the measuring device and the measurable surface when the detecting detects that the distal end of the stylus has contacted the measurable surface, the relative displacement between the measuring device and the measurable surface is temporarily stopped.

5. A control method of a surface characteristic measuring apparatus, wherein the surface characteristic measuring apparatus includes:

a measuring device that measures a surface characteristic of a measurable surface by profiling and scanning the measurable surface while in contact with the measurable surface of a measurable object; and a relative displacement mechanism that relatively displaces, three-dimensionally, the measuring device and the measurable object such that the measuring device scans and displaces along the measurable surface, the measuring device includes:

a measuring arm supported so as to be capable of performing a circular arc movement with a rotation axis as a fulcrum;

a stylus provided to a distal end of the measuring arm; and a movement detector that detects displacement by the circular arc movement of the measuring arm, and with a vertical direction defined as a Z-axis direction and one direction orthogonal to the Z-axis direction defined as an X-axis direction, the control method of the surface characteristic measuring apparatus comprising:

relatively displacing, by the relative displacement mechanism, the measuring device and the measurable object in the Z-axis direction such that the measuring device and the measurable surface approach each other;

detecting when the distal end of the stylus is in contact with the measurable surface;

continuing for a predetermined time the relative displacement of the measuring device and the measurable surface in the Z-axis direction after the distal end of the stylus contacts the measurable surface;

calculating a displacement amount $\Delta X_G$ in the X-axis direction generated in the distal end of the stylus during the predetermined time; and relatively displacing only by $\Delta X_G$ the measuring device and the measurable object in the X-axis direction by the relative displacement mechanism while relatively displacing the measuring device and the measurable object in the Z-axis direction by the relative displacement mechanism.

* * * * *

UNITED STATES PATENT AND TRADEMARK OFFICE
CERTIFICATE OF CORRECTION

Page 1 of 1

PATENT NO. : 11,175,123 B2
APPLICATION NO. : 16/439035
DATED : November 16, 2021
INVENTOR(S) : T. Ishioka et al.

It is certified that error appears in the above-identified patent and that said Letters Patent is hereby corrected as shown below:

On the Title Page

Item (56), Foreign Patent Documents, please include "2012-225742A 11/15/2012 JP"

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*